United States Patent
Ohm et al.

(10) Patent No.: US 9,242,416 B1
(45) Date of Patent: Jan. 26, 2016

(54) AEROSOL TIRE SEALANT AND INFLATOR ASSEMBLY

(71) Applicant: Bell Automotive Products, Inc., Scottsdale, AZ (US)

(72) Inventors: Patrick Ohm, Mesa, AZ (US); Silas Veloz, Sacramento, CA (US); C. Kwai Kong, Gilroy, CA (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 0 days.

(21) Appl. No.: 14/338,275

(22) Filed: Jul. 22, 2014

(51) Int. Cl.
    *B29C 73/16* (2006.01)
    *B65D 83/68* (2006.01)
    *B65D 83/20* (2006.01)
    *B65D 83/22* (2006.01)
    *B65D 83/24* (2006.01)

(52) U.S. Cl.
    CPC ............ *B29C 73/166* (2013.01); *B65D 83/205* (2013.01); *B65D 83/22* (2013.01); *B65D 83/24* (2013.01); *B65D 83/68* (2013.01)

(58) Field of Classification Search
    CPC ...... B65D 83/205; B65D 83/22; B65D 83/24; B65D 83/756
    USPC ......... 141/3, 9, 20, 38, 382–385; 222/402.11, 222/402.13, 402.14, 153.02, 153.11, 222/153.12, 153.13, 635
    See application file for complete search history.

(56) References Cited

U.S. PATENT DOCUMENTS

| | | | | |
|---|---|---|---|---|
| 2,598,308 | A * | 5/1952 | Samuels et al. | 222/43 |
| 4,773,567 | A * | 9/1988 | Stoody | 222/153.11 |
| 4,941,600 | A * | 7/1990 | Berriochoa et al. | 222/402.13 |
| 6,382,469 | B1 * | 5/2002 | Carter et al. | 222/153.06 |
| 6,708,849 | B1 * | 3/2004 | Carter et al. | 222/153.1 |
| 8,333,304 | B1 * | 12/2012 | Haage | 222/402.14 |

* cited by examiner

*Primary Examiner* — Timothy L Maust
*Assistant Examiner* — Timothy P Kelly
(74) *Attorney, Agent, or Firm* — Booth Udall Fuller, PLC

(57) ABSTRACT

An aerosol tire sealant and inflator assembly includes an aerosol bottle, a lid, an actuator, and a hose. The aerosol bottle has pressurized tire sealant and air housed therein. The lid has an actuator opening extending through the lid and a sloped locking lip extending from an inner wall. The locking lip includes a first portion and a second portion. The actuator is positioned within the actuator opening and rotatably coupled to the lid between a closed position and an open position. The actuator has a coupling and an actuator tab engaged with the first portion of the locking lip when the actuator is in the closed position and engaged with the second portion of the locking lip when the actuator is in the open position. The hose includes a coupling configured to couple to the actuator and a coupling configured to couple to a tire stem.

20 Claims, 8 Drawing Sheets

AEROSOL TIRE SEALANT AND INFLATOR ASSEMBLY

BACKGROUND

1. Technical Field

Aspects of this document relate generally to aerosol tire sealant and inflator bottle assemblies.

2. Background Art

Aerosol bottles that allow users to at least partially inflate and seal a punctured flat tire are available to consumers. Conventional bottle assemblies require a user to continuously press an actuator or button coupled to the bottle to transfer air and tire sealant from the bottle to the tire.

SUMMARY

Aspects of the present disclosure relate to an aerosol tire sealant and inflator assembly and may comprise an aerosol bottle comprising pressurized tire sealant and air housed therein and a nozzle, a lid coupled to the bottle, the lid comprising an inner wall that forms an actuator opening extending through the lid and at least one locking lip on the inner wall, the at least one locking lip comprising a first portion and at least a second portion, and an actuator partially positioned within the actuator opening and rotatably coupled to the lid between a closed position and an open position, the actuator comprising a first coupling and at least one actuator tab engaged with the at least one locking lip, wherein when the actuator is in the closed position the at least one actuator tab engages with the at least one locking lip at the first portion and temporarily locks the actuator in the closed position such that no pressurized tire sealant and air is exhausted from the bottle, and when the actuator is in the open position the at least one actuator tab engages with the at least one locking lip at the second portion and temporarily locks the actuator in the open position such that pressurized tire sealant and air from the bottle exhausts from the nozzle, through the actuator, and out the first coupling.

Particular implementations of an aerosol tire sealant and inflator assembly may comprise one or more of the following. The hose may comprise a second coupling configured to removably couple to the first coupling and a third coupling configured to removably couple to a tire stem. The first portion of the at least one locking lip may comprise a slot and the second portion of the at least one locking lip may extends away from the first portion around the inner wall adjacent a stop tab extending from the actuator opening. The at least one locking lip may comprise a sloped portion between the slot and the second portion such that when the actuator is in the closed position the first coupling is further from the lid than when the actuator is in the open position. The at least one locking lip may comprise two locking lips each comprising a first portion comprising a slot and a second portion adjacent a stop tab, and the at least one actuator tab may comprise two actuator tabs, wherein the slots are opposite one another on the inner wall, the stop tabs are opposite one another on the inner wall, the two actuator tabs are opposite one another on the actuator. The first coupling may comprise a male threaded coupling, the second coupling may comprise a female threaded coupling, and the third may comprise comprises a female threaded coupling. One or more hose mounting tabs on the lid forming a hose mounting channel, wherein the hose may be removably coupled to the lid at least partially within the house mounting channel. A cap coupled to the lid may be sized to cover the actuator, the hose mounting channel, and the hose.

According to another aspect of the disclosure, an aerosol tire sealant and inflator assembly may comprise an aerosol bottle comprising pressurized tire sealant and air housed therein and a nozzle, a lid coupled to the bottle, the lid comprising an inner wall that forms an actuator opening extending through the lid and at least one locking lip on the inner wall, the at least one locking lip comprising a first portion, a second portion, and a sloped portion extending between the first portion and the second portion, an actuator partially positioned within the actuator opening and rotatably coupled to the lid between a closed position and an open position, the actuator comprising a first coupling and at least one actuator tab engaged with the first portion of the at least one locking lip when the actuator is in the closed position and engaged with the second portion of the at least one locking lip when the actuator is in the open position, and a hose comprising a second coupling configured to removably couple to the first coupling and a third coupling configured to removably couple to a tire stem.

Particular implementations of an aerosol tire sealant and inflator assembly may comprise one or more of the following. The first portion of the at least one locking lip may comprise a slot and the second portion of the at least one locking lip may extend away from the first portion around the inner wall adjacent a stop tab. When the actuator is in the closed position, the at least one actuator tab may engage with the slot and temporarily lock the actuator in the open position such that no pressurized tire sealant and air is exhausted from the bottle, and when the actuator is in the open position the at least one actuator tab may engage with the at least one locking lip at the second portion and temporarily lock the actuator in the open position such that pressurized tire sealant and air from the bottle exhausts from the nozzle, through the actuator, and out the first coupling. The at least one lock lip may comprise two locking lips and the at least one actuator tab may comprise two actuator tabs. The first coupling may comprise a male threaded coupling, the second coupling may comprise a female threaded coupling, and the third coupling may comprise a female threaded coupling. One or more hose mounting tabs on the lid may form a hose mounting channel, wherein the hose may be removably coupled to the lid at least partially within the house mounting channel. A cap coupled to the lid may be sized to cover the actuator, the hose mounting channel, and the hose.

According to another aspect of the disclosure, a method of sealing and at least partially inflating a tire may comprise coupling an aerosol tire sealant and inflator bottle to a tire stem of a tire, the bottle comprising a lid coupled thereto, pressing an actuator rotatably coupled to the lid until tire sealant and air is exhausted from the bottle into the tire stem through the actuator, locking the actuator in an open position by rotating the actuator from a closed position to the open position while pressing the actuator, rotating the actuator from the open position to the closed position when the tire is at least partially filled with tire sealant and air exhausted from the bottle, and uncoupling the bottle and the tire stem.

Particular implementations of sealing and at least partially inflating a tire may comprise one or more of the following. Pressing the actuator rotatably coupled to the lid comprises pressing the actuator until an actuator tab on the actuator disengages from a slot on a locking lip on an inner wall of the lid adjacent the actuator, and locking the actuator in the open position by rotating the actuator from the closed position to the open position while pressing the actuator comprises locking the actuator in the open position by rotating the actuator from the closed position to the open position while pressing the actuator until the actuator tab abuts a stop tab on the inner wall of the lid and engages with a portion of the locking lip adjacent the stop tab, wherein the locking lip slopes from the slot to the stop tab. Coupling a first coupling of a hose to the tire stem, the hose being coupled to the actuator. Threadedly coupling a first coupling of a hose to second coupling on the actuator, and threadedly coupling a third coupling of the hose to the tire stem. Releasing pressure applied to the actuator when the actuator is locked in the open position.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended aerosol tire sealant and inflator assembly and/or assembly procedures for an aerosol tire sealant and inflator assembly will become apparent for use with implementations of aerosol tire sealant and inflator assemblies from this disclosure. Accordingly, for example, although particular bottles, lids, hoses, and actuators are disclosed, such bottles, lids, hoses, and actuators and implementing components may comprise any shape, size, style, type, model, version, measurement, concentration, material, quantity, and/or the like as is known in the art for such aerosol tire sealant and inflator assemblies and implementing components, consistent with the intended operation of aerosol tire sealant and inflator assemblies.

Conventional aerosol tire sealant and inflator assemblies require a user to continuously press and actuator to transfer tire sealant and air from the aerosol bottle to the tire. As shall be shown and described in greater detail throughout this the disclosures of this application, contemplated herein is an improved aerosol tire sealant and inflator assembly that allows transfer of tire sealant and air from the aerosol bottle even when the user is not manually pressing the actuator. Thus, various embodiments contemplated herein are more efficient and easier for user than conventional aerosol tire sealant and inflator assemblies.

Figure 1:
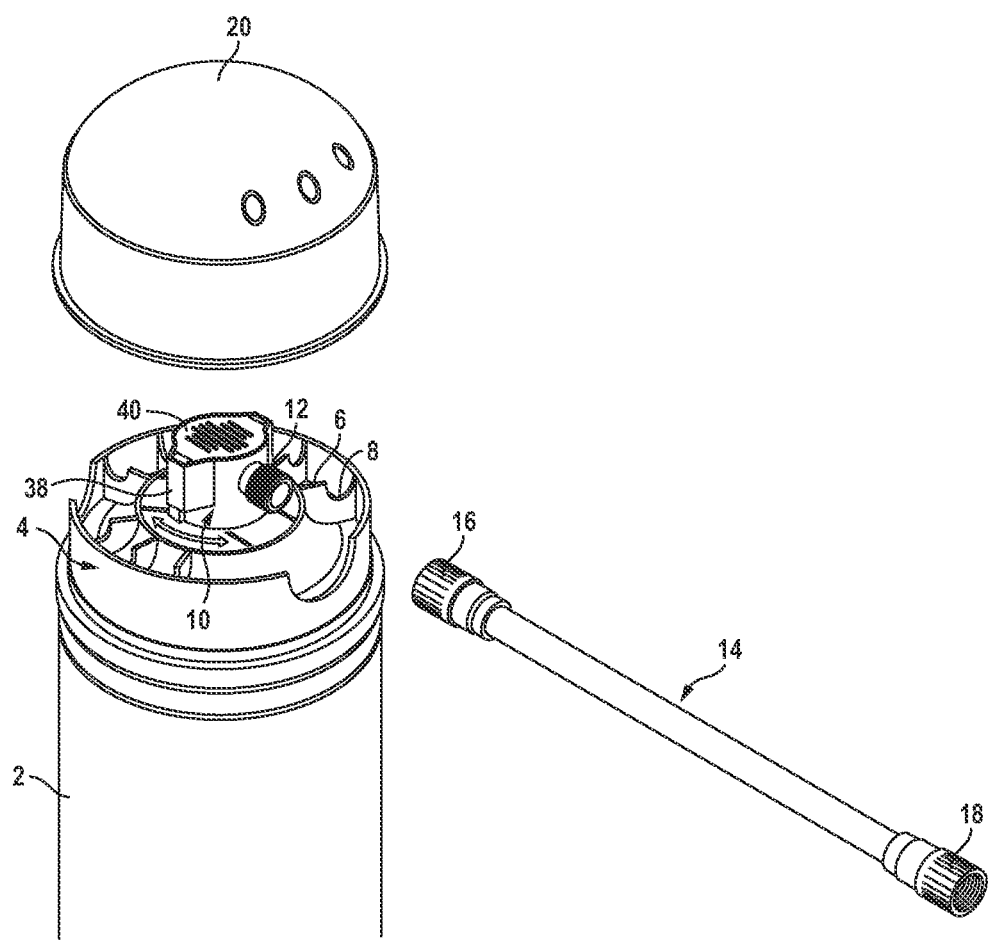
FIG. 1 is a partial break apart view of an aerosol tire sealant and inflator assembly with the cap and hose separated from the bottle.
Figure 2:
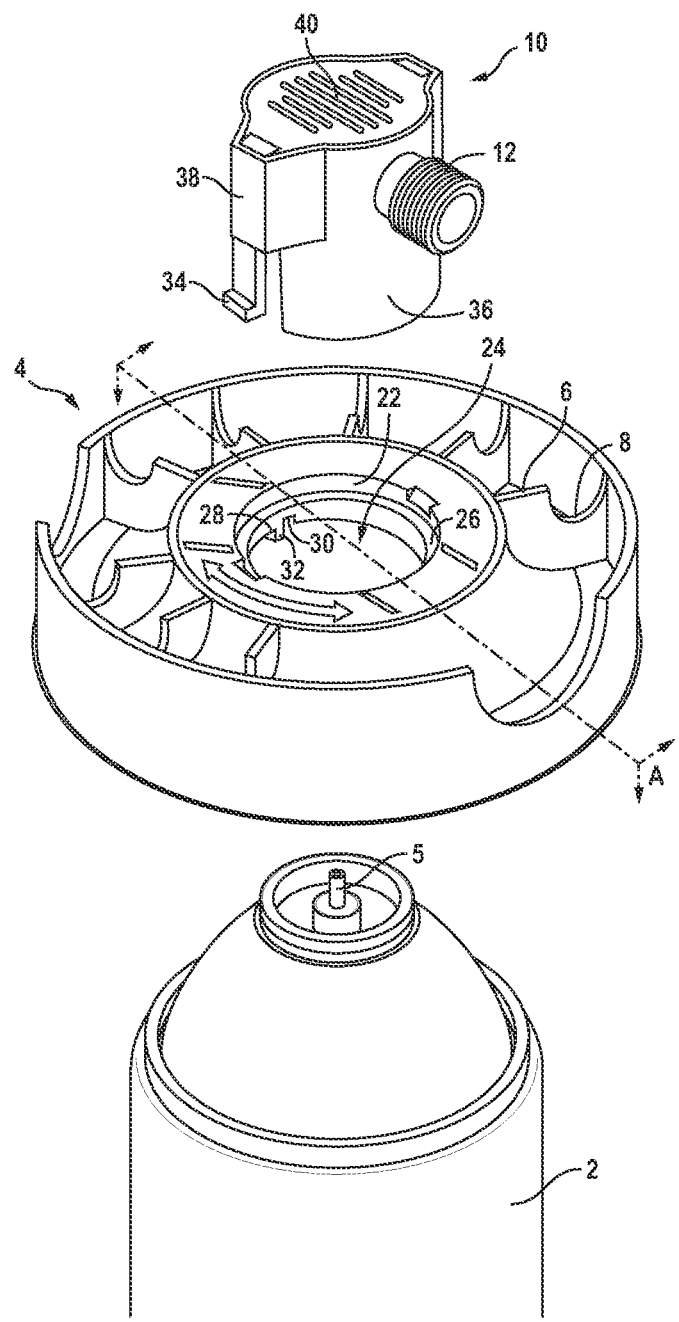
FIG. 2 is a partial break apart view of an aerosol tire sealant and inflator assembly with the actuator, lid, and bottle separated from one another.

In one or more embodiments, an aerosol tire sealant and inflator assembly comprises an aerosol bottle 2 (FIG. 1) comprising pressurized tire sealant and air housed therein. The aerosol bottle 2, tire sealant, and air may comprise any aerosol bottle, tire sealant, and air known in the art. FIG. 2 depicts a non-limiting embodiment of a portion of an aerosol bottle 2 comprising a nozzle 5. The nozzle 5 of the aerosol bottle 2 may comprise any nozzle 5 known in the art and adapted for use with the actuator 10 as described herein. For example, according to one aspect, the nozzle 5 is configured to exhaust air and tire sealant from the bottle 2 responsive to downward pressure being applied to the nozzle 5.

Figure 3:
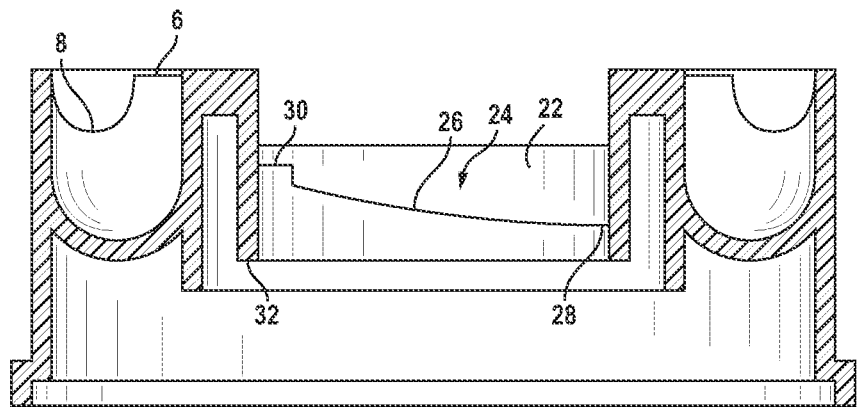
FIG. 3 is a cross sectional view taken along sectional line A in FIG. 2.
Figure 4:
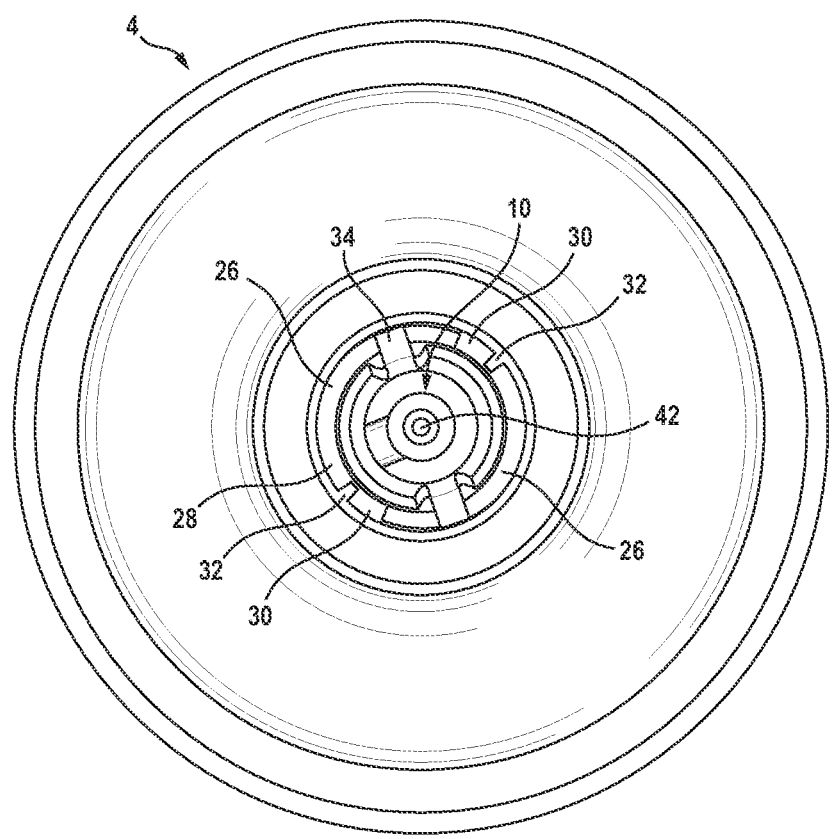
FIG. 4 is a bottom view of an actuator coupled to a lid.

One or more embodiments of an aerosol tire sealant and inflator assembly further comprise a lid 4 coupled to the bottle 2. FIG. 1 depicts a non-limiting embodiment of a lid 4 coupled to a bottle 2, FIG. 2 depicts a non-limiting embodiment of a lid 4 separated from a bottle 2 and actuator 10, FIG. 3 depicts a cross sectional view of a non-limiting embodiment of a lid 4 taken from line A of FIG. 2, and FIG. 4 depicts a non-limiting embodiment of a lid 4 coupled to an actuator 10. The lid 4 may be either fixedly or removably coupled to the bottle 2. A lid typically comprises an inner wall 22 that forms an actuator opening 24 extending through the lid 4. The actuator opening 24 is typically positioned adjacent the nozzle 5 when the lid 4 is coupled to the bottle 2.

As shown in the non-limiting cross sectional view of FIG. 3, one or more embodiments of a lid 4 comprise at least one locking lip 26 on the inner wall 22 by extending from or cutting into the inner wall 22 of the lid 4. Each locking lip 26 typically comprises a first portion 30 and a second portion 28. According to one aspect, the locking lip 26 comprises a sloped locking lip that slopes from the first portion 30 to the second portion 28. When the locking lip 26 is sloped, the first portion 30 and second portion 28 of the locking lip 26 may guide an actuator tab from the first portion 30 to the second portion 28, though this is not required. In one or more embodiments, the first portion 30 comprises a slot and the second portion is positioned adjacent a stop tab 32 extending from or cutting into the inner wall 22 of the lid. The slotted first portion 30 is typically sized to receive and lock an actuator 34 tab of the actuator 10 in place when the actuator 10 is rotated to the closed position (shown in FIG. 1). In some embodiments, the second portion 28 is likewise slotted similar to the slotted first portion 30. Alternatively, the second portion 28 may comprise a slope similar to sloped locking lip 26 between the first portion 30 and the second portion 28 or a flat portion.

According to a particular aspect, the at least one locking lip 26 comprises two, three, four, or more locking lips 26 extending outward from or cutting into the inner wall 22 of the lid 4. In lid 4 embodiments comprising a plurality of locking lips 26, stop tabs 32 are positioned equidistance from one another to divide adjacent locking lips 26. For example, in an embodiment comprising to locking lips 26, such as the non-limiting embodiments shown in FIGS. 1-4, a lid 4 comprises two stop tabs positioned 180 degrees, or opposite, from one another. In such embodiments, then, the first portions 30 and second portions 28 of the two locking lips are likewise substantially opposite one another. In an embodiment comprising three locking lips 26, a lid 4 typically comprises three stop tabs 32 positioned approximately 120 degrees from one another. In an embodiment comprising four locking lips 26, a lid 4 typically comprises four stop tabs 32 positioned approximately 90 degrees from one another.

One or more embodiments of a lid 4 further comprise at least one hose mounting tab 6. Each hose mounting tab 6 is typically positioned on a surface opposite bottle 2 when the lid 4 is coupled to the bottle 6. According to some aspects, each hose mounting tab 6 comprises a hose mounting channel 8 (shown in FIGS. 1-3). In embodiments comprising a plurality of hose mounting tabs 6, the plurality of hose mounting tabs 6 may be arranged such that an annular hose mounting channel 8 on the lid 4. The hose mounting channel 8 is sized to hold a portion of the hose 14 therein. In one more embodiments, the lid 4 comprises a gap between adjacent hose mounting tabs 6 sufficient to position the second 16 and third 18 couplings between the hose mounting tabs 6 when the hose 14 is mounting within the hose mounting channel 8.

Figure 5:
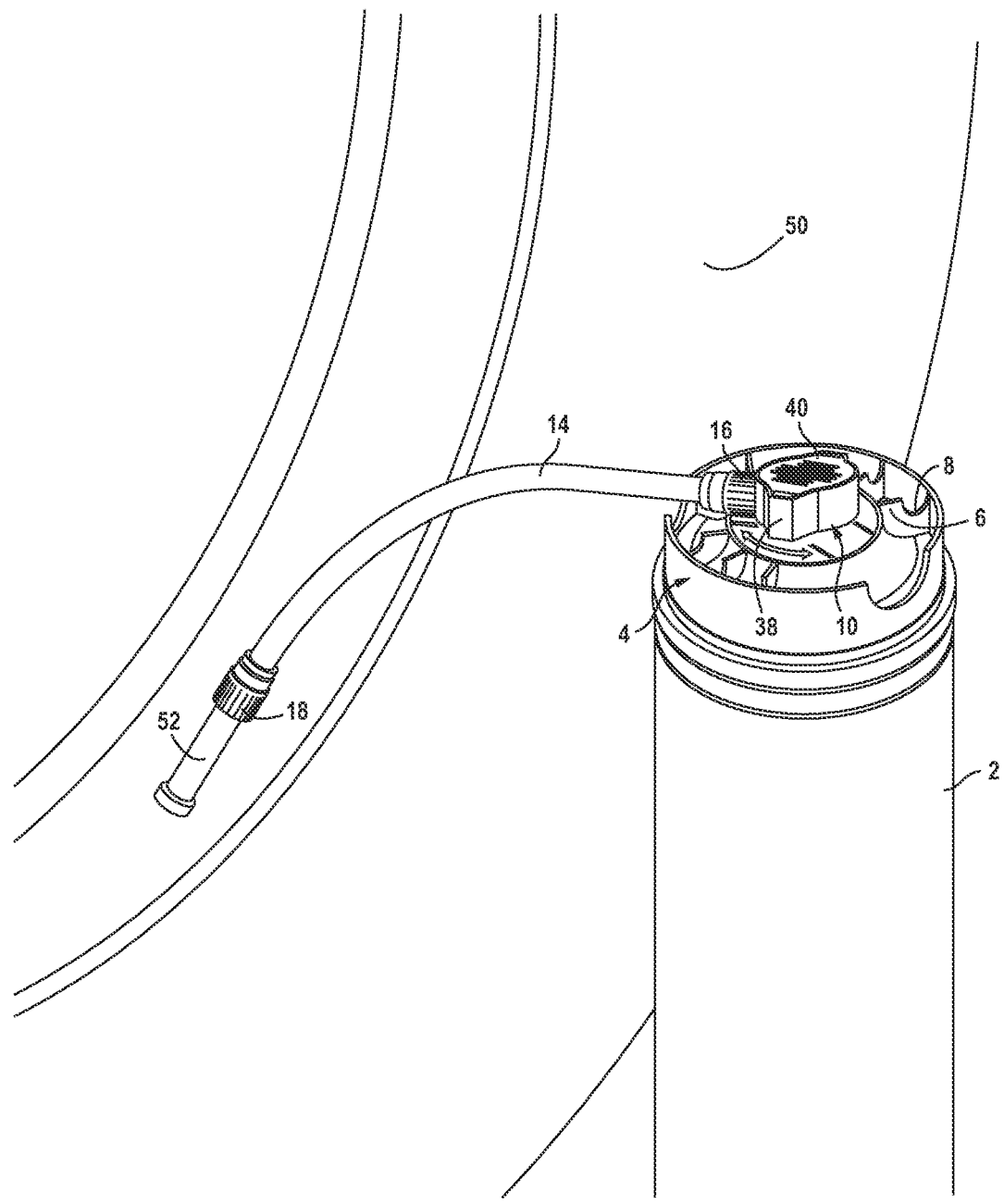
FIG. 5 is a perspective view of an aerosol tire sealant and inflator assembly operably coupled to a tire stem of a tire.

Various lid 4 embodiments may further comprise directional and/or actuator positioning markings. For example, as shown in FIGS. 1 and 2, an arrow may be placed on the lid 4, the arrow indicating the rotational movement of the actuator 10 between the open position and the closed position. The lid 4 may further comprise dividing lines that indicate when actuator is in the open and/or closed position. For example, in FIG. 1, the first coupling 12 of the actuator 10 is oriented between a first pair of dividing lines, the actuator 10 itself being in the closed position. In FIG. 5, the first coupling 12 of the actuator is oriented between a second pair of dividing lines, the actuator 10 itself being in the open position. Other indicators may be shown in the dividing lines to allow a user to know which position the actuator is in, such as but not limited to numbers, locked/unlocked locks, stop signs, color indicators, and the like. One or more embodiments of a lid 4 further comprise two recesses on an outer rim of the lid. The two recesses are typically aligned with the two sets of dividing lines, allowing the hose 14 extend through the recesses when coupled to the first coupling 12.

One or more embodiments of an aerosol tire sealant and inflator assembly further comprise an actuator 10 rotatably coupled to the lid 4. The actuator 10 is rotatable between at least an open position and a closed position. In the non-limiting embodiment of FIG. 1, the actuator 10 is in the closed position, while in the non-limiting embodiment of FIG. 5, the actuator 10 is in the open position. The actuator 10 typically comprises a substantially cylindrical body 36 and one or more turning grips 38 extending from an outer surface of the body 36. The body 36 is sized to fit and freely rotate within the actuator opening 24 of the lid 4. In one or more embodiments, the one or more turning grips 38 act as a stop and prevent the body 36 from sliding further into the actuator opening 24 than desired. The actuator may also comprise one or more press grips 40 on a top end of the actuator. The press grips 40 are configured to provide traction or gripping for a users finger while the user is pressing the actuator 10.

The actuator 10 typically also comprises a first coupling 12 on the body 36 of the actuator 10. The first coupling 12 may comprise any coupling known in the art, such as but not limited to a threaded coupling, a snap-fit coupling, and the like. In the particular non-limiting embodiment of FIGS. 1 and 2, the first coupling 12 comprises a male threaded coupling. In other embodiments, the first coupling may comprise a female threaded coupling.

In one or more embodiments, the actuator 10 further comprises nozzle receiver 42 (shown in FIG. 4). The nozzle receiver 42 is positioned within the body 36 and sized to receive a portion of the nozzle 5 when the actuator 10 is pressed. Accordingly, the nozzle receiver 42 is aligned with the nozzle 5 of the bottle 2 when the assembly is assembled. A passage typically extends through the nozzle receiver 42 and the first coupling 12, the passage allowing fluid communication between the nozzle receiver 42 and the first coupling 12. In operation, when the actuator 10 is pressed, the nozzle receiver 42 depresses the nozzle 5 and air and tire sealant are exhausted from the bottle 2 (responsive to depression of the nozzle 5). Air and tire sealant, then, pass from the bottle 2 through the nozzle 5, the nozzle receiver 42, and the first coupling 12 when the actuator 10 is pressed by a user.

One or more embodiments of an actuator 10 further comprise at least one actuator tab 34 (shown in FIGS. 2 and 4). The number of actuator tabs 34 is typically equal to the number of locking lips 26 and stop tabs 32. For example, in the non-limiting embodiment depicted in FIGS. 2-4, the actuator comprises two opposing actuator tabs 34. The at least one actuator tab 34 typically extends outward from the body 36 of the actuator 10. According to some implementations, the at least one actuator tab 34 is at a terminating end of a body member partially separated from the body 36 of the actuator 10. Partial separation of the body member from the body 36 allows the actuator tab 34 to be pressed or biased inward when the actuator 10 is inserted into the actuator opening 24, and then return to an original position extending outward from the body 36 to engage with the locking lip 26 after the actuator 10 has been inserted into the actuator opening 24.

More particularly, the at least one actuator tab 34 engages with the various portions of the locking lip 26 as the actuator is rotated within the lid 4. FIG. 4 depicts a bottom view of a non-limiting embodiment of an actuator 10 rotatably coupled to a lid 4. In this particular view, the actuator 10 is rotated partway between the open and closed positions. As such, the actuator tabs 34 are engaged with the locking lips 26 between the slotted first portion 30 and the second portion 28 adjacent the stop tabs 32. In this particular embodiment, the locking lip slopes between the slotted first portion 28 and the second portion.

For example, in one non-limiting example, the actuator tab 34 engages with the first portion 30 of the locking lip 26 when the actuator 10 is in the closed position and engages with the second portion 28 of the locking lip 26 when the actuator 10 is in the open position. More particularly, the actuator tab 34 may engage with the locking lip 26 within the slotted first portion 30 when in the closed position. In such an engagement, the slotted first portion 30 temporarily locks the actuator in the closed position and prevents or inhibits rotation of the actuator 10 unless the actuator 10 is pressed to lower the actuator tab 34 below the slotted first portion 30. More particularly, the actuator tab 34 may engage with the second portion 28 of the locking lip and abut or otherwise be adjacent to a stop tab 32 when the actuator 10 is in the open position. In one or more embodiments, the actuator 10 is temporarily locked or held in position with the actuator tab 32 engaged with the second portion 28 due to the force exerted on the nozzle receiver 42 by the nozzle 5, which biases the actuator 10 away from the bottle 2. The force, however, acts to strengthen engagement between the actuator tab 34 and the second portion 28 of the locking lip. Because the first portion 30 and the second portion 28 of the locking lip 26 are on different planes from one another, the actuator 10 is held in different positions relative to the lid 4 and bottle 2 when the actuator tab 34 is engaged with the first portion 30 and the second portion 28 of the locking lip 26.

By way of further example, in one non-limiting embodiment, the actuator 10 is positioned further from the bottle 2 when the actuator tab 34 is engaged with the first portion 30 of the locking lip 26 than when the actuator tab 34 is engaged with the second portion 28 of the locking lip 26. In such an embodiment, when the actuator 10 is at the greater distance from the bottle 2 with the actuator tab 34 engaged with the first portion 30, the distance is sufficient that the nozzle receiver 42 does not exert enough force on the nozzle 5 to exhaust air and tire sealant from the bottle 2. On the other hand, when the actuator 10 is at the lesser distance from the bottle 2 with the actuator tab 34 engaged with the second portion 28, the distance is sufficient that the nozzle receiver 42 exerts enough force on the nozzle 5 to exhaust air and tire sealant from the bottle 2 and into passage of the nozzle receiver 42 and first coupling 12.

One or more embodiments of an aerosol tire sealant and inflator assembly further comprise a cap 20, a non-limiting embodiment of which is depicted in FIG. 1. The cap is configured to couple to the lid 4 and house the actuator 10 and hose 14 therein when coupled to the lid 4.

One or more embodiments of an aerosol tire sealant and inflator assembly further comprise a hose 14. FIG. 1 depicts a non-limiting embodiment of a hose 14 separated from an actuator 10, and FIG. 5 depicts a non-limiting embodiment of a hose 14 coupled to the actuator 10. The hose 14 may comprise any hose known in the art such as, but not limited to, a rubber or a plastic hose. According to one aspect, the hose 14 comprises a second coupling 16 and a third coupling 18. The second coupling 16 is typically configured to removably couple to the first coupling 12 of the actuator and the third coupling 18 is typically configured to removably couple to a tire stem 52 (shown in FIG. 5). In some embodiments, the second coupling 16 comprises a female threaded coupling configured to threadedly couple to the male threaded coupling 12 of the actuator. In other embodiments, the second coupling 16 comprises a male threaded coupling configured to threadedly couple to a female threaded coupling on an actuator. In still other embodiments, the hose 14 is fixedly coupled to the actuator 10 without couplings. In some embodiments, the third coupling 18 comprises a female threaded coupling configured to threaded couple to the male threaded coupling of a tire stem 52.

FIGS. 6-11 depict another non-limiting embodiment of a lid 64 that may be used in combination with one or more of a hose 14, bottle 2, actuator 10, and/or cap 20 similar to other lid embodiments contemplated and described in this document. Unless otherwise specified, one or more embodiments of a lid 64 comprise aspects identical or similar to those described in relation to a lid 4, such as, but not limited to hose mounting tabs 6, a hose mounting channel 8, an actuator opening 24, an inner wall 78, a first portion 74 of a locking lip, a second portion 68, and a stop tab 76.

Figure 6:
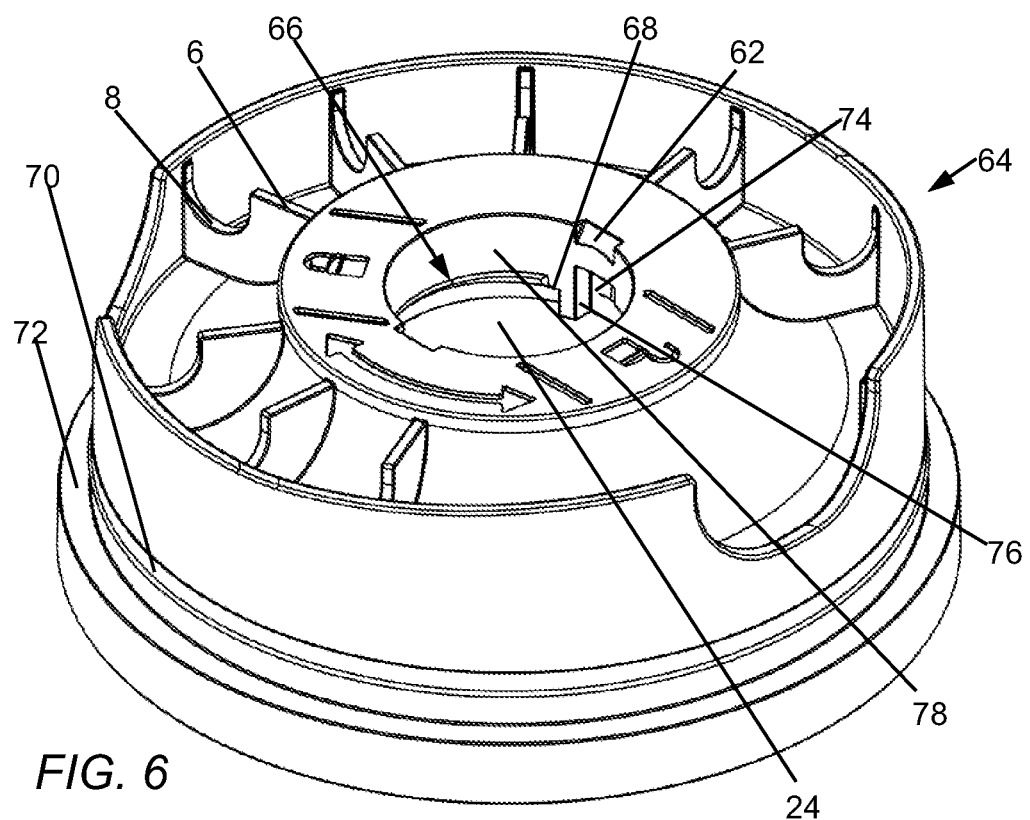
FIG. 6 is a perspective view of a particular embodiment of a lid.

FIG. 6 depicts a perspective view of a non-limiting embodiment of a lid 64. One or more embodiments of a lid 64 further comprise one or more lead-in chamfers 62 on the inner wall 78 of the lid 64. In the non-limiting embodiment depicted in FIGS. 6-11, the lid 64 comprises two opposing chamfers approximately 180 degrees from one another. The two lead-in chamfers 62 allow for easier insertion of the actuator 10 into the actuator opening 24 when the actuator tabs 34 are aligned with the lead-in chamfers 62. According to some aspects, the two slotted first portions 74 of the lid 64 are aligned with the two lead-in chamfers 62. In such a configuration, the lead-in chamfers 62 direct the actuator tabs 34 into the slotted first portions 74 of the locking lip. When the actuator tabs 34 of the actuator 10 are directed into the slotted first portions 74, it is less likely that the actuator 10 will actuate the nozzle 5 of the bottle 2 as the actuator 10 is being inserted into the actuator opening 24 of the lid 64.

Figure 7:
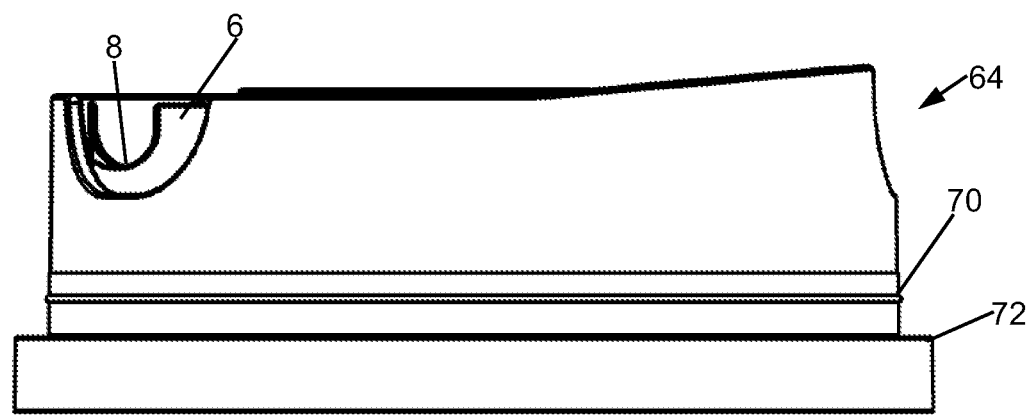
FIG. 7 is a side view of the lid of FIG. 6.

FIG. 7 depicts a side view of a non-limiting embodiment of a lid 64. As depicted in FIG. 7, the perspective view of FIG. 6, the top view of FIG. 9, and the cross-sectional view of FIG. 10, one or more embodiments of a lid 64 further comprise a stepped base 72 and an outer snap ring 70. The stepped base 72 typically comprises a diameter larger than the diameter of the rest of the lid 62 and is configured to allow the lid 64 to fit around and removably couple to a rim of a conventional aerosol bottle 2. The outer snap ring 70 is typically positioned proximate the stepped base 72 and is configured to allow the cap 20 to snap onto the lid 64.

Figure 8A:
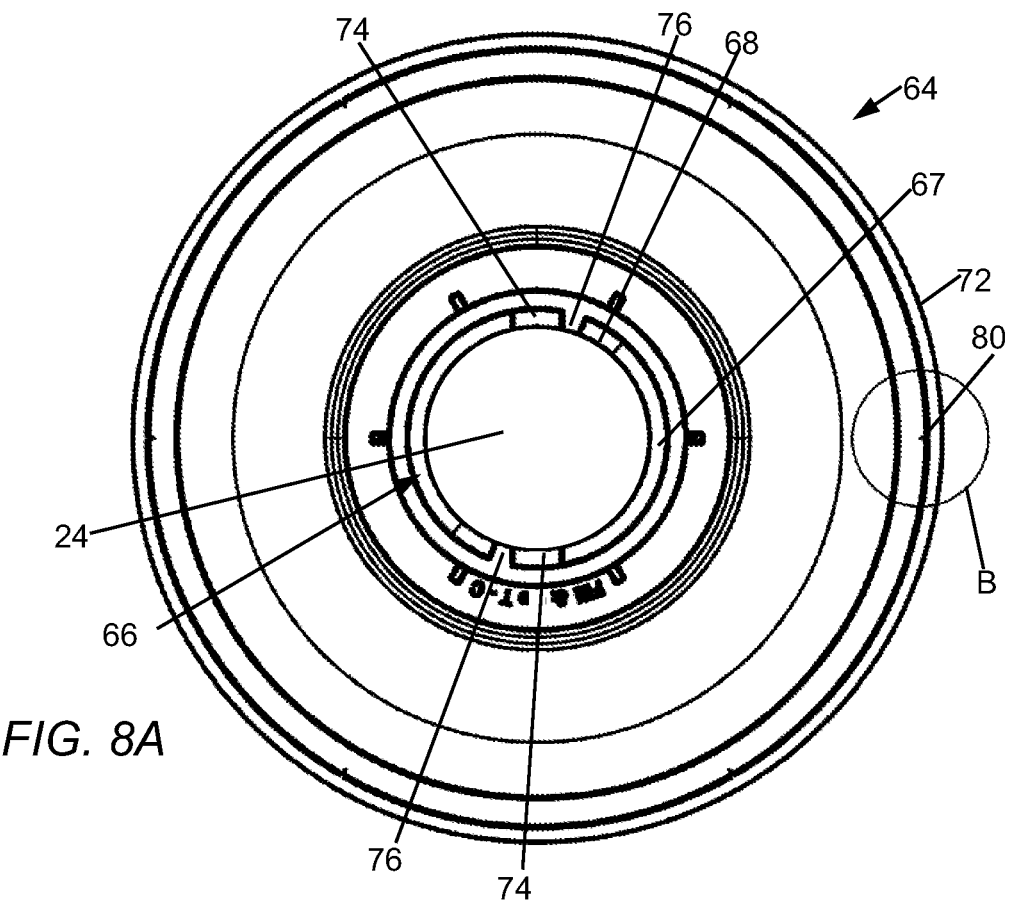
FIG. 8A is a bottom view of the lid of FIG. 6.
Figure 8B:
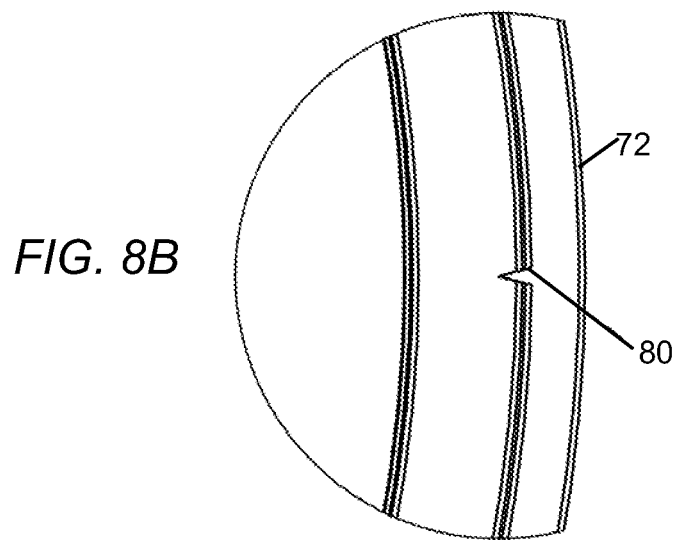
FIG. 8B is a close-up view of a portion of the lid of FIG. 8A as designated by circle B of FIG. 8A.

FIG. 8A depicts a bottom view of a lid 64 and FIG. 8B depicts a close-up view of a portion of the lid 64 as designated by circle B of FIG. 8A. One or more embodiments of a lid 64 further comprise a crushable rib 80 proximate the stopped base 72 of the lid 64. The crushable rib 80 may comprise a variety of shapes, such as, but not limited to a triangular crushable rib 80. The crushable ribs 80 are configured to engage with a rim of a bottle having a smaller diameter and crush against the rim of a bottle having a larger diameter. This allows the lid 64 to be applied to bottles having varying sizes of rims.

Figure 9:
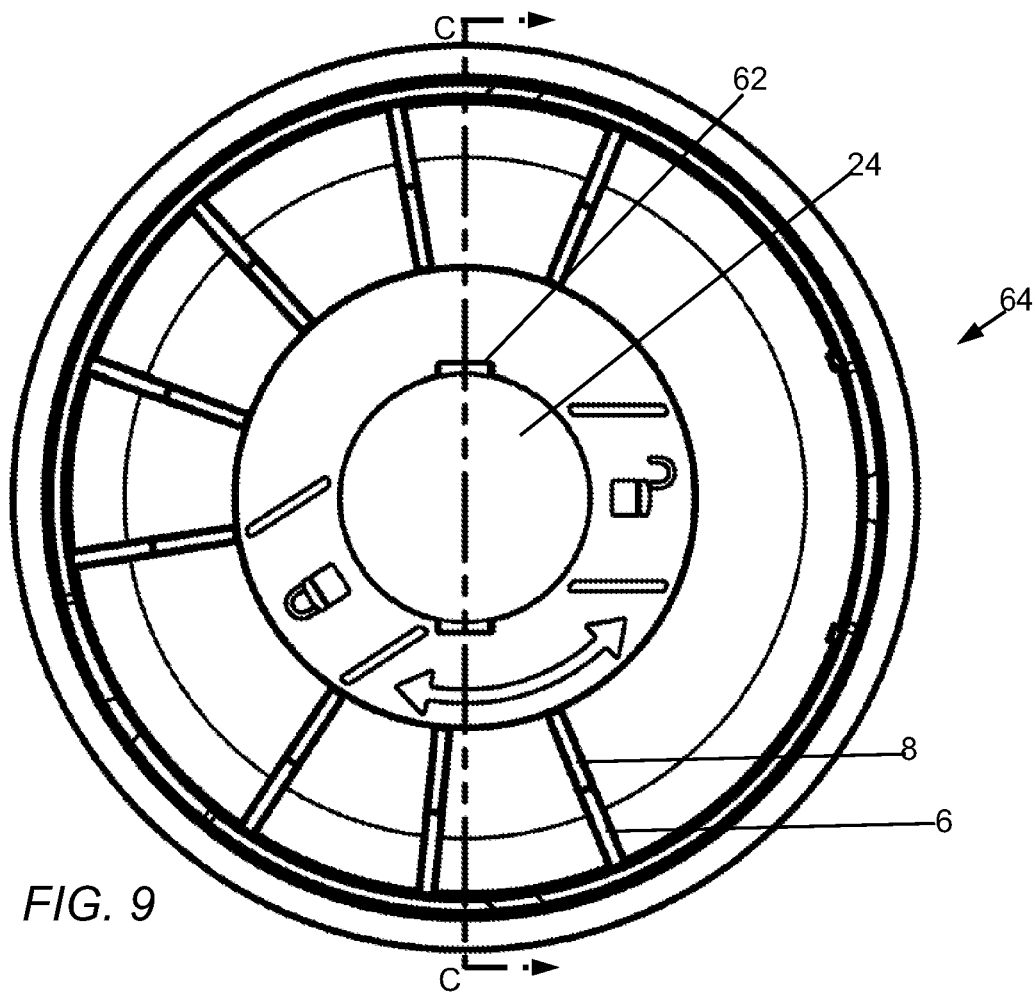
FIG. 9 is a top view of a particular embodiment of the lid of FIG. 6.
Figure 10:
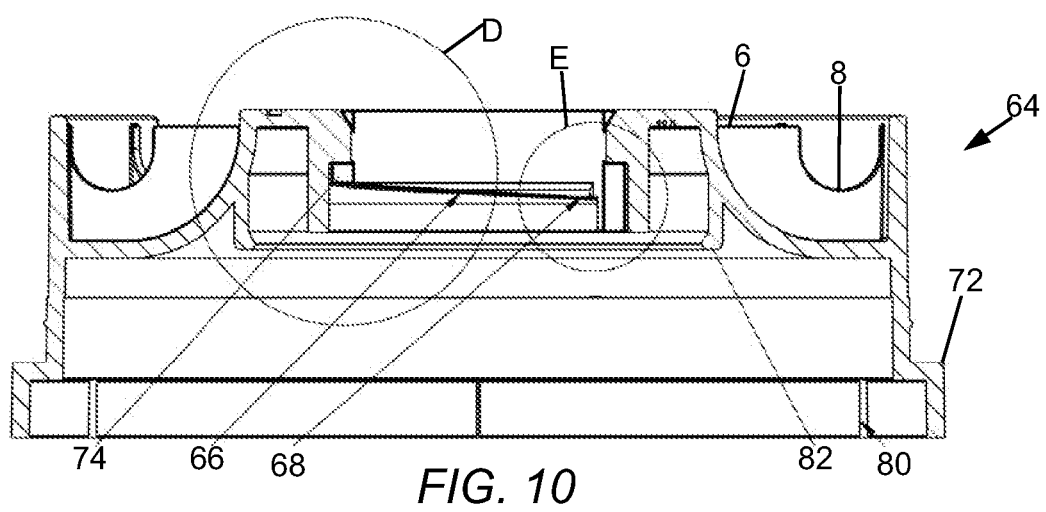
FIG. 10 is a cross-sectional view of the lid of FIG. taken along line C-C of FIG. 9.
Figure 11A:
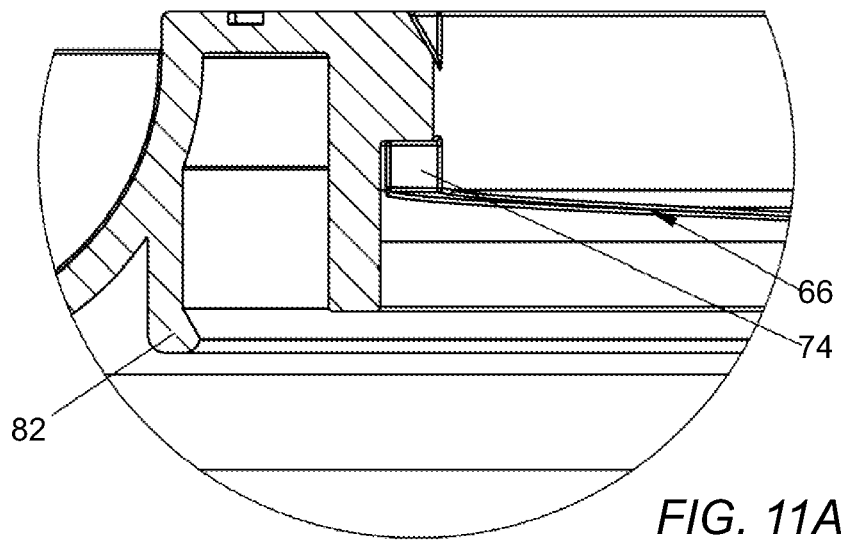
FIG. 11A is a close-up view of a portion of the cross-sectional FIG. 10 as designated by circle D of FIG. 10.

FIG. 9 depicts a top view of a non-limiting embodiment of a lid 64 and FIG. 10 depicts a cross-sectional view of a lid 64 taken from line C-C of FIG. 9. As depicted in FIG. 9, one or more embodiments of a lid 64 further comprise an inner snap ring 82. The inner snap ring 82 is positioned between the actuator opening 24 and the outer walls of the lid 64 and is configured to snap onto the upper, smaller rim of a conventional aerosol bottle 2. The smaller rim of the conventional aerosol bottle, as depicted in FIG. 2, typically surrounds the nozzle 5 of the aerosol bottle 2. According to some aspects, the inner snap ring 82 comprises a complete 360 degree ring. In other aspects, the inner snap ring 82 comprises a broken ring. FIG. 11A depicts a close view of a portion of the cross-sectional FIG. 10 as designated by circle D. As shown, in this non-limiting embodiment the inner snap ring 82 may extend inward. The inner snap ring 82 typically comprises an internal angled wall that is configured to account for assembly tolerances.

Figure 11B:
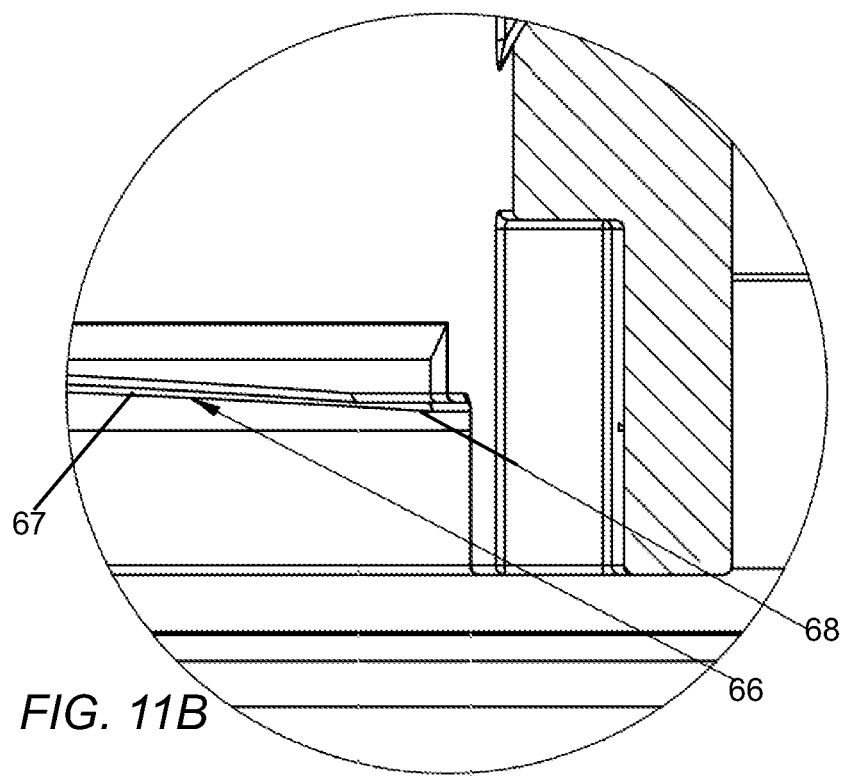
FIG. 11B is a close-up view of a portion of the lid of FIG. 10 as designated by circle E of FIG. 10.

FIG. 11B depicts a close-up view according to circle E of FIG. 10. One or more embodiments of a lid 64 comprise a non-sloped or substantially horizontal second portion 68 and extends away from from the first portion around the inner wall adjacent the stop tab. Thus, in this and other embodiments, the locking lip 66 comprises a slotted first portion 74, a substantially horizontal second portion 68, and a sloped portion 67 extending between the slotted first portion 74 and the substantially horizontal second portion 68. As with other embodiments described herein, a stop tab 76 is typically positioned between the second portion 68 and first portion 74 of adjacent locking lips 66. The substantially horizontal second portion 68 is configured to inhibit the actuator tabs 68 from rotating back up the sloped portion 67 to the first portion 74 under the pressure applied by the nozzle 5.

Also contemplated as part of this disclosure is a method of sealing and at least partially inflating a tire 50. According to one aspect, a method comprises coupling an aerosol tire sealant and inflator bottle 2 to a tire stem of a tire 50, the bottle comprising a lid 2 coupled thereto. More particularly, coupling a bottle 2 to the tire stem 52 may comprise threadedly coupling a coupling 18 on a hose 14 to a tire stem 52, with the hose being removably or fixedly coupled to an actuator 10. Even more particularly, coupling a bottle 2 to the tire stem 52 may comprise threadedly coupling a coupling 16 of a hose 14 to a coupling 12 on the actuator and threadedly coupling a coupling 18 on the hose 14 to the tire stem 52. FIG. 5 depicts a non-limiting embodiment of an aerosol tire sealant and inflator assembly after the hose 14 has been removably coupled to a tire stem 52 of a tire 50 according to embodiments of method contemplated herein.

According to another aspect, a method comprises pressing an actuator 10 rotatably coupled to the lid 2 until tire sealant and air are exhausted from the bottle 2 into the tire stem 52 through the actuator 10. More particularly, pressing the actuator 10 until tire sealant and air exhausted from the bottle 2 may comprise pressing the actuator 2 until an actuator tab 32 disengages from a slotted first portion 30 on a locking lip 26 on an inner wall 22 of the lid 4 adjacent the actuator 10.

According to another aspect, a method comprises locking an actuator 10 in an open position by rotating the actuator 10 from a closed position to the open position while pressing the actuator 10. More particularly, locking the actuator 10 in the open position by rotating the actuator 10 from the closed position to the open position while pressing the actuator 10 comprises locking the actuator 10 in the open position by rotating the actuator 10 from the closed position to the open position while pressing the actuator 10 until an actuator tab 34 abuts a stop tab 32 on the inner wall 22 of the lid 4 and engages with the locking lip 26 adjacent the stop tab 32, wherein the locking lip 26 slops from the slot 30 to the stop tab 32.

According to another aspect, a method comprises releasing pressuring applied to the actuator 10 when the actuator 10 is temporarily locked in the open position. Such a step is advantageous to conventional aerosol tire sealant assemblies, which require a user to continuously apply pressure to a button or actuator in order to transfer air and tire sealant into the tire.

According to another aspect, a method comprises rotating the actuator 10 from the open position to the closed position when the tire 50 is at least partially filled with tire sealant and air exhausted from the bottle 2. According to still other aspects, a method comprises uncoupling the bottle 2 and the tire stem 52.

It will be understood that implementations are not limited to the specific components disclosed herein, as virtually any components consistent with the intended operation of a method and/or system implementation for aerosol tire sealant and inflator assemblies may be utilized. Accordingly, for example, although particular bottles, lids, hoses, and actuators may be disclosed, such components may comprise any shape, size, style, type, model, version, class, grade, measurement, concentration, material, weight, quantity, and/or the like consistent with the intended operation of a method and/or system implementation for an aerosol tire sealant and inflator assembly may be used.

In places where the description above refers to particular implementations of aerosol tire sealant and inflator assemblies it should be readily apparent that a number of modifications may be made without departing from the spirit thereof and that these implementations may be applied to other aerosol tire sealant and inflator assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An aerosol tire sealant and inflator assembly, comprising:
an aerosol bottle comprising pressurized tire sealant and air housed therein and a nozzle;
a lid coupled to the bottle, the lid comprising an inner wall that forms an actuator opening extending through the lid and at least one locking lip formed on and extending inward from the inner wall, the at least one locking lip comprising a first portion and at least a second portion; and
an actuator partially positioned within the actuator opening and rotatably coupled to the lid between a closed position and an open position, the actuator comprising a first coupling and at least one actuator tab engaged with the at least one locking lip, wherein when the actuator is in the closed position the at least one actuator tab engages with the at least one locking lip at the first portion and temporarily locks the actuator in the closed position such that no pressurized tire sealant and air is exhausted from the bottle, and when the actuator is in the open position the at least one actuator tab engages with the at least one locking lip at the second portion and temporarily locks the actuator in the open position such that pressurized tire sealant and air from the bottle exhausts from the nozzle, through the actuator, and out the first coupling.

2. The aerosol tire sealant and inflator assembly of claim 1, wherein the first coupling comprises a first threaded coupling and further comprising a hose, the hose comprising a second threaded coupling configured to removably couple to the first threaded coupling and a third threaded coupling configured to removably couple to a tire stem.

3. The aerosol tire sealant and inflator assembly of claim 2, wherein the first portion of the at least one locking lip comprises a slot and the second portion of the at least one locking lip extends away from the first portion around the inner wall adjacent a stop tab extending from the actuator opening.

4. The aerosol tire sealant and inflator assembly of claim 3, wherein the at least one locking lip comprises a sloped portion between the slot and the second portion such that when the actuator is in the closed position the first coupling is further from the lid than when the actuator is in the open position.

5. The aerosol tire sealant and inflator assembly of claim 4, wherein the at least one locking lip comprises two locking lips each comprising a first portion comprising a slot and a second portion adjacent a stop tab, and the at least one actuator tab comprises two actuator tabs, wherein the slots are opposite one another on the inner wall, the stop tabs are opposite one another on the inner wall, the two actuator tabs are opposite one another on the actuator.

6. The aerosol tire sealant and inflator assembly of claim 2, further comprising a hose mounting channel integral to the lid and sized to hold a portion of the hose therein, wherein the hose is removably coupled to the lid at least partially within the house mounting channel.

7. The aerosol tire sealant and inflator assembly of claim 1, wherein the actuator further comprises one or more turning grips extending from a body of the actuator, the body being sized to fit and rotate within the actuator opening.

8. The aerosol tire sealant and inflator assembly of claim 1, wherein the at least one actuator tab is configured to bias inward when the actuator is inserted into the actuator opening before engaging with the one or more locking lips extending inward from the actuator opening.

9. An aerosol tire sealant and inflator assembly, comprising:
an aerosol bottle comprising pressurized tire sealant and air housed therein and a nozzle;
a lid coupled to the bottle, the lid comprising an inner wall that forms an actuator opening extending through the lid and at least one locking lip on the inner wall, the at least one locking lip comprising a first portion, a second portion, and a sloped portion extending between the first portion and the second portion;

an actuator partially positioned within the actuator opening and rotatably coupled to the lid between a closed position and an open position, the actuator comprising a first coupling and at least one actuator tab engaged with the first portion of the at least one locking lip between the at least one locking lip and the aerosol bottle when the actuator is in the closed position and engaged with the second portion of the at least one locking lip between the at least one locking lip and the aerosol bottle when the actuator is in the open position; and a hose comprising a second coupling configured to removably couple to the first coupling and a third coupling configured to removably couple to a tire stem.

10. The aerosol tire sealant and inflator assembly of claim 9, wherein the at least one locking lip is formed on and extends inward from the inner wall, the first portion of the at least one locking lip comprises a slot and the second portion of the at least one locking lip extends away from the first portion around the inner wall adjacent a stop tab.

11. The aerosol tire sealant and inflator assembly of claim 10, wherein when the actuator is in the closed position, the at least one actuator tab engages with the slot and temporarily locks the actuator in the closed position such that no pressurized tire sealant and air is exhausted from the bottle, and when the actuator is in the open position the at least one actuator tab engages with the at least one locking lip at the second portion and temporarily locks the actuator in the open position such that pressurized tire sealant and air from the bottle exhausts from the nozzle, through the actuator, and out the first coupling.

12. The aerosol tire sealant and inflator assembly of claim 9, wherein the first coupling comprises a male threaded coupling, the second coupling comprises a female threaded coupling, and the third coupling comprises a female threaded coupling.

13. The aerosol tire sealant and inflator assembly of claim 9, further comprising a hose mounting channel formed within the lid and sized to hold a portion of the hose therein, wherein the hose is removably coupled to the lid at least partially within the house mounting channel.

14. The aerosol tire sealant and inflator assembly of claim 13, further comprising a cap coupled to the lid, the cap sized to cover the actuator, the hose mounting channel, and the hose.

15. The aerosol tire sealant and inflator assembly of claim 9, wherein the lid comprises a single-piece lid comprising the inner wall and the at least one locking lip, and the actuator comprises a single-piece actuator comprising the at least one actuator tab, a body sized to fit and rotate within the actuator opening, and one or more turning grips.

16. A method of sealing and at least partially inflating a tire, comprising:
    coupling an aerosol tire sealant and inflator bottle to a tire stem of a tire, the bottle comprising a lid coupled thereto;
    pressing an actuator rotatably coupled to the lid until tire sealant and air is exhausted from the bottle into the tire stem through the actuator;
    locking the actuator in an open position by rotating the actuator from a closed position to the open position while pressing the actuator;
    rotating the actuator with two opposing side grips on the actuator from the open position to the closed position when the tire is at least partially filled with tire sealant and air exhausted from the bottle; and
    uncoupling the bottle and the tire stem.

17. The method of claim 16, wherein:
    pressing the actuator rotatably coupled to the lid comprises pressing the actuator until an actuator tab on the actuator disengages from a slot on a locking lip extending inwardly from an inner wall of the lid adjacent the actuator; and
    locking the actuator in the open position by rotating the actuator from the closed position to the open position while pressing the actuator comprises locking the actuator in the open position by rotating the actuator from the closed position to the open position while pressing the actuator until the actuator tab abuts a stop tab on the inner wall of the lid and engages with a portion of the locking lip adjacent the stop tab, wherein the locking lip slopes from the slot to the stop tab.

18. The method of claim 17, wherein coupling the bottle to the tire stem comprises threadedly coupling a first coupling of a hose to the tire stem, the hose being coupled to the actuator.

19. The method of claim 17, wherein coupling the bottle to the tire stem comprises:
    threadedly coupling a first coupling of a hose to second coupling on the actuator; and
    threadedly coupling a third coupling of the hose to the tire stem.

20. The method of claim 16, further comprising releasing pressure applied to the actuator when the actuator is locked in the open position.

* * * * *